US011905795B1

(12) United States Patent
Qureshi et al.

(10) Patent No.: US 11,905,795 B1
(45) Date of Patent: Feb. 20, 2024

(54) COILED TUBING SNAP ARRESTOR

(71) Applicant: SAUDI ARABIAN OIL COMPANY, Dhahran (SA)

(72) Inventors: Muhammad Ali Qureshi, Abqaiq (SA); Arris Riagung Riskiawan, Abqaiq (SA); Abdullah Shabib Dossary, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/938,625

(22) Filed: Oct. 6, 2022

(51) Int. Cl.
*E21B 40/00* (2006.01)
*G01P 3/00* (2006.01)
*E21B 19/22* (2006.01)

(52) U.S. Cl.
CPC .............. *E21B 40/00* (2013.01); *E21B 19/22* (2013.01); *G01P 3/00* (2013.01)

(58) Field of Classification Search
CPC ........ E21B 19/22; E21B 40/00; E21B 40/001; G01P 3/00
See application file for complete search history.

(56) References Cited

U.S. PATENT DOCUMENTS

| 4,515,220 A * | 5/1985 | Sizer | E21B 19/22 166/384 |
| 11,661,804 B1 * | 5/2023 | Steffenhagen | E21B 19/10 166/385 |
| 2003/0010505 A1 * | 1/2003 | Gipson | E21B 19/22 166/77.2 |
| 2003/0155127 A1 * | 8/2003 | Carlsen | E21B 19/22 166/344 |
| 2012/0248078 A1 * | 10/2012 | Zediker | E21B 7/14 219/121.67 |
| 2022/0235617 A1 * | 7/2022 | Day | E21B 19/22 |
| 2023/0076707 A1 * | 3/2023 | Shan | E21B 19/22 |

* cited by examiner

*Primary Examiner* — Shane Bomar
(74) *Attorney, Agent, or Firm* — Vorys, Sater, Seymour and Pease LLP

(57) ABSTRACT

A coiled tubing system includes an injector assembly configured to receive and longitudinally move coiled tubing through the injector assembly, a well control stack operatively coupled to the injector assembly and configured to receive the coiled tubing from the injector assembly, and a snap arrestor including one or more wheels configured to rotate as the coiled tubing moves longitudinally, a tachometer that measures rotations per minute (RPM), and a microprocessor that receives and converts the RPM into a real-time measured linear speed of the coiled tubing. When the real-time measured linear speed of the coiled tubing exceeds a predetermined linear speed threshold, a command signal is sent to the injector assembly to grippingly engage the coiled tubing and thereby cease longitudinal movement of the coiled tubing.

15 Claims, 2 Drawing Sheets

COILED TUBING SNAP ARRESTOR

FIELD OF THE DISCLOSURE

The present disclosure relates generally to coiled tubing injector systems and, more particularly, to a fail-safe mechanism that prevents severed coiled tubing from dangerous recoil or dropping into a wellbore.

BACKGROUND OF THE DISCLOSURE

In the oil and gas industry, coiled tubing (alternately referred to as "coil tubing") is often used for performing various downhole operations, such as washing out sand bridges, circulating treating fluids, running logging or intervention tools, setting downhole tools, milling debris within the wellbore, cleaning internal walls of well pipes, fishing out lost tools in the wellbore, conveying producing fluids or lift gases downhole, and a number of other remedial or production-related operations. More recently, coiled tubing has also been used in drilling operations. To accomplish these operations, various types of downhole tools and bottom hole assemblies (BHAs) can be attached to the downhole (distal) end of coiled tubing, and the coiled tubing is then conveyed downhole in a controlled manner from the well surface using a coiled tubing injector system.

Among other components, coiled tubing injector systems include a surface-mounted injector assembly or "injector head" operatively coupled to a sliding seal system referred to as a "stripper." After the coiled tubing is conveyed through the stripper, the injector head literally forces or "injects" the coiled tubing into the well at a force sufficient to overcome the well pressure and until the weight of the tubing exceeds the force produced by the pressure acting against the cross-sectional area of the tubing. Thereafter, the weight of the tubing will be supported by the injector head. The process is reversed as the coiled tubing is removed from the well. Advances in the design of coiled tubing have resulted in large tubings having increased wall thickness and sufficient tensile strength to support up to 20,000 feet hanging in a wellbore.

While running coiled tubing downhole or pulling coiled tubing out of a wellbore, a sudden failure of the coiled tubing at any point below the injector head can result in an uncontrolled release or recoil, which can have serious operational and health, safety, and environment (HSE) ramifications. The lower broken part of the coiled tubing that falls into the wellbore, for example, can lead to expensive and time-consuming fishing operations, which might not be successful and could lead to further well reclamation measures (e.g., the need for a side-track wellbore). On the other hand, the upper broken part of coiled tubing can recoil and potentially eject downhole tools or the entire BHA out of the injector head at elevated velocities. Depending on the magnitude of the tension released when the coiled tubing fails, debris and/or projectiles could be ejected from the injector head and cause serious personnel injury and damage to adjacent equipment.

What is needed is a fail-safe mechanism designed to prevent coiled tubing from being dropped in a wellbore or ejected out of the injector head in the event the coiled tubing fails while under tension. Such fail-safe mechanisms will promote operational safety and mitigate catastrophic damage caused by coiled tubing recoil.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the disclosure, a coiled tubing system includes an injector assembly configured to receive and longitudinally move coiled tubing through the injector assembly, a well control stack operatively coupled to the injector assembly and configured to receive the coiled tubing from the injector assembly, and a snap arrestor interposing the injector assembly and the well control stack. The snap arrestor may include one or more wheels arranged to contact an outer surface of the coiled tubing and configured to rotate as the coiled tubing moves longitudinally, a tachometer that measures rotations per minute (RPM) of the one or more wheels, and a microprocessor that receives and converts the RPM into a real-time measured linear speed of the coiled tubing. When the real-time measured linear speed of the coiled tubing exceeds a predetermined linear speed threshold, a command signal is sent to the injector assembly to grippingly engage the coiled tubing and thereby cease longitudinal movement of the coiled tubing.

According to another embodiment consistent with the present disclosure, a method includes receiving coiled tubing at an injector assembly having a well control stack operatively coupled thereto, operating the injector assembly to longitudinally move the coiled tubing through the injector assembly and the well control stack, and calculating a real-time measured linear speed of the coiled tubing with a snap arrestor interposing the injector assembly and the well control stack. The snap arrestor may include one or more wheels arranged to contact an outer surface of the coiled tubing and configured to rotate as the coiled tubing moves longitudinally, a tachometer that measures rotations per minute (RPM) of the one or more wheels, and a microprocessor that receives and converts the RPM into a real-time measured linear speed of the coiled tubing. The method may further include sending a command signal to the injector assembly when the real-time measured linear speed of the coiled tubing exceeds a predetermined linear speed threshold, and in response to receipt of the command signal, grippingly engaging the coiled tubing with the injector assembly and thereby ceasing longitudinal movement of the coiled tubing.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
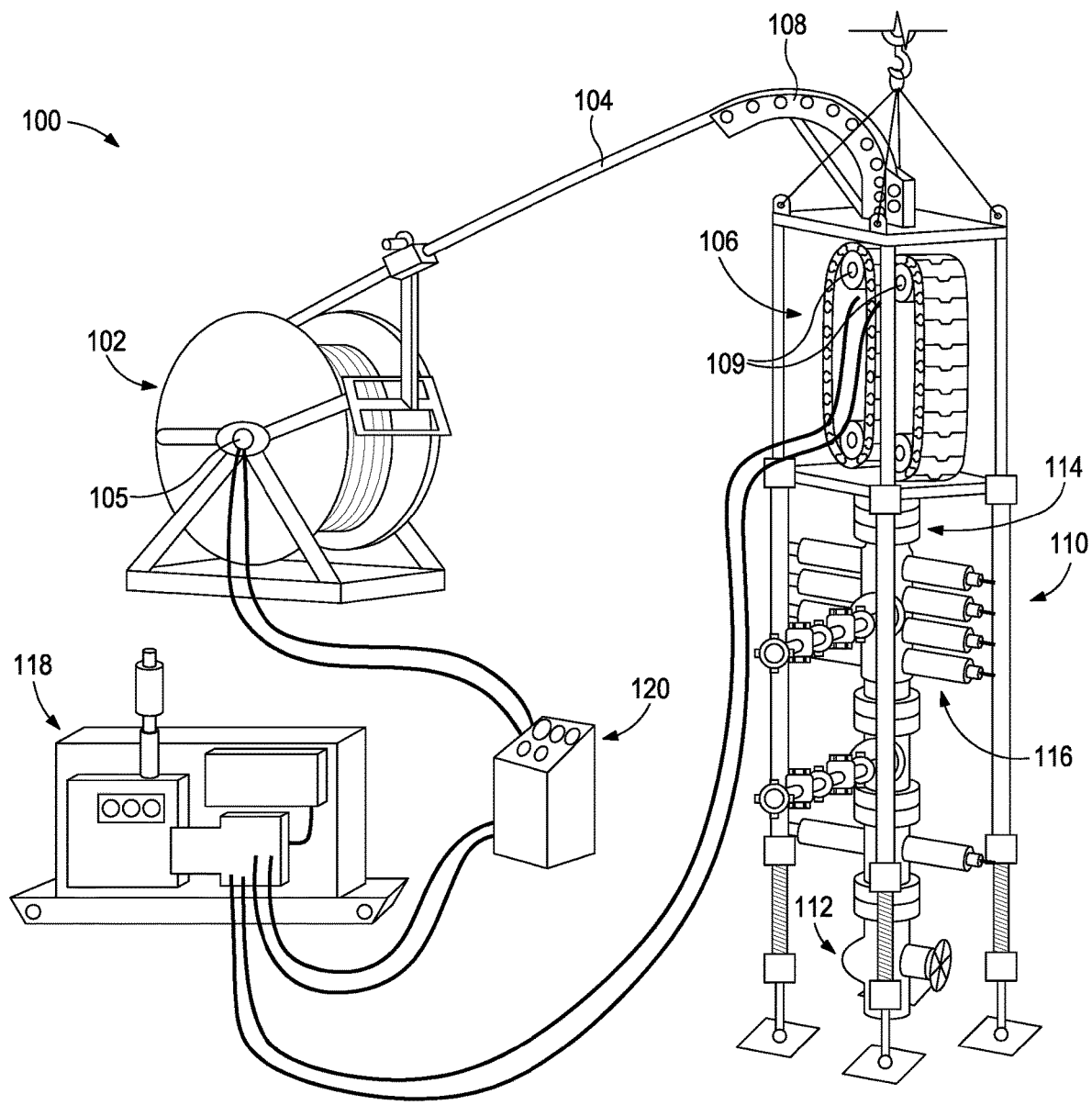
FIG. 1 is a schematic diagram of an example coiled tubing system that may employ the principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to coiled tubing injector systems. Various safety mechanisms are typically included in coiled tubing injector systems, but may not be triggered due to several reasons, one of which is human error. Embodiments of the present disclosure describe a fail-safe mechanism that is instantaneously triggered once the coiled tubing breaks or is severed and immediately ceases longitudinal movement of the coiled tubing in or out of the injector head. As described herein, the fail-safe mechanism may be configured to monitor the real-time linear speed of the coiled tubing and, if the linear speed crosses a certain predefined threshold, then fail-safe mechanism stops longitudinal movement of the coiled tubing.

FIG. 1 is a schematic diagram of an example coiled tubing system 100 that may employ the principles of the present disclosure. As illustrated, the coiled tubing system 100 (hereafter "the system 100") includes a spool or "reel" 102, which serves as a storage apparatus for coiled tubing 104. The coiled tubing 104 comprises a continuous length of flexible pipe capable of being wound onto and unwound from the reel 102. In some applications, the reel 102 may be mounted to a transport vehicle, such as a truck, but could alternatively be mounted to a production rig or may otherwise be skid-mounted. Rotation of the reel 102 may be controlled by a hydraulic motor 105 mounted as a direct drive on the reel 102 or operated by a chain-and-sprocket drive assembly (not shown).

The coiled tubing 104 is guided from the reel 102 to an injector assembly 106 via a tubing guide arch 108, alternately referred to as a "gooseneck." The tubing guide arch 108 supports the coiled tubing 104 through a bending radius, for example 90°, and guides the coiled tubing 104 into the injector assembly 106. The injector assembly 106, alternately referred to as an "injector head," is designed to grip the outer diameter of the coiled tubing 104 and provide the force required to convey the coiled tubing 104 into a wellbore and subsequently retrieve the coiled tubing 104. The injector assembly 106 is designed to support the full weight of the coiled tubing 104, and allows an operator to control the rate of lowering the coiled tubing 104 into the well.

Various designs and configurations of the injector assembly 106 may be used in accordance with the principles of the present disclosure. For example, the injector assembly 106 can include, but is not limited to, an opposed counter-rotating, chain drive system, an arched-chain roller drive system, a single-chain, opposed gripper-drive system, a sheave drive system, or any combination thereof. In the illustrated embodiment, the injector assembly 106 is depicted as a vertically mounted, counter-rotating chain drive system. As will be described in more detail below, the injector assembly 106 may include opposing, sprocket-driven traction chains powered by counter-rotating hydraulic motors 109, but could alternatively be driven by other means, without departing from the scope of the disclosure.

The system 100 may further include a well control stack 110 operatively coupled to the injector assembly 106 and interposing the injector assembly 106 and a wellhead 112, which constitutes the surface termination of a wellbore drilled into the underlying earth surface. The well control stack 110 can include, for example, a stripper assembly 114 and a blowout preventer or "BOP" 116. The stripper assembly 114 interposes the injector assembly 106 and the BOP 116 and provides the necessary pressure control and lubrication for the coiled tubing 104 as the coiled tubing 104 is conveyed downhole or retrieved.

The BOP 116 may comprise a plurality of hydraulically-operated rams. For example, the BOP 116 can include one or more blind rams, tubing shear rams, slip rams, and pipe rams. The blind rams may be used to seal off the wellbore at the surface if well control is lost. The tubing shear rams may be used to mechanically break (sever) the coiled tubing 104 in the event the coiled tubing 104 becomes stuck within the well control stack 110 or whenever it may be necessary to cut the coiled tubing 104 and remove the surface equipment from the well. The slip rams may include bidirectional teeth, which, when activated, secure against the coiled tubing 104 and support the weight of the coiled tubing 104 and any tools or assembly coupled thereto. The pipe rams may be equipped with elastomer seals and may be used to isolate the wellbore annulus pressure below the BOP 116.

The system 100 may further include a power source 118 (alternately referred to as a "power pack") used to power operation of the injector assembly 106 and the reel 102. In some applications, the power source 118 may comprise a hydraulic-pressure pump system including one or more multistage hydraulic pumps powered by one or more diesel engines. Alternatively, the power source 118 may comprise an electric generator system. The power source 118 may be designed to convey hydraulic fluid to operate various components of the system 100, such as the reel 102 and the injector assembly 106. In particular, among other operations, hydraulic fluid may be conveyed to operate the hydraulic motors 105, 109 of the reel 102 and the injector assembly 106, respectively, and thereby selectively control movement of the coiled tubing 104.

In some applications, the system 100 may also include a control console 120 in communication with the power source 118. The control console 120 can include various controls and gauges required to operate and monitor all of the components during operation of the system 100. An operator may be able to control operation of all facets of the system 100 from the control console 120. The hydraulic motors 105, 109 of the reel 102 and the injector assembly 106 may be activated (operated) via the control console 120, which may be configured to manipulate one or more valves that determine the direction of motion for the coiled tubing 104 and operating speed and braking. In at least one application, one or both of the power source 118 and the control console 120 may be positioned on a transport vehicle along with the reel 102, but could alternatively comprise skid-mounted components. The control console 120, for example, may be arranged within a control cabin mounted to the bed of a truck.

Figure 2:
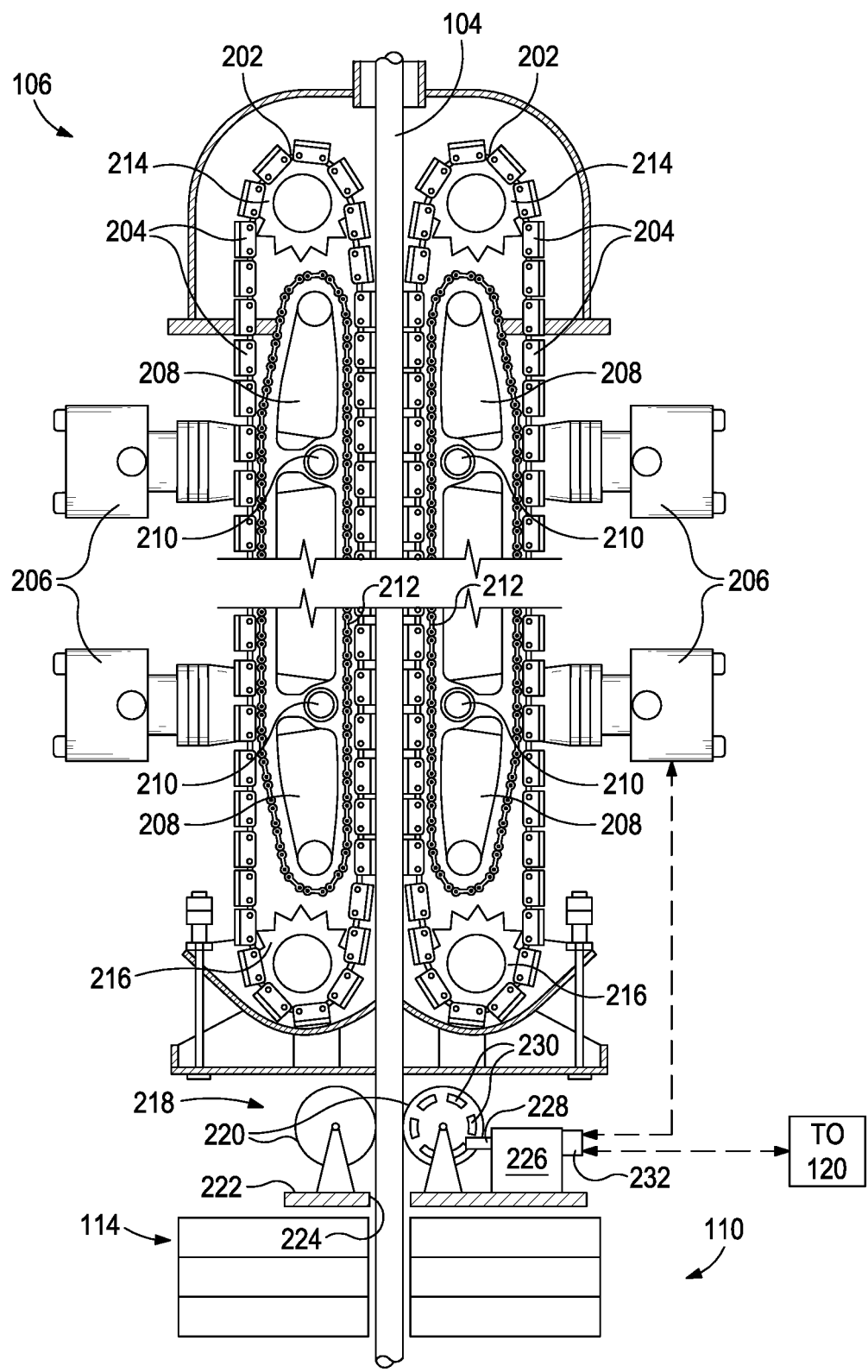
FIG. 2 is a schematic diagram of the injector assembly of FIG. 1, according to one or more embodiments of the present disclosure.

FIG. 2 is a schematic diagram of one example of the injector assembly 106, according to one or more embodiments of the present disclosure. The injector assembly 106 is shown gripping the coiled tubing 104, which extends through the interior of the injector assembly 106. Again, as noted above, the injector assembly 106 can be provided in a variety of designs and configurations without departing from the scope of the disclosure. In the illustrated embodiment, the injector assembly 106 includes a pair of endless drive chains 202 positioned on opposite sides of the coiled tubing 104. Each drive chain 202 includes and otherwise carries a plurality of gripper blocks 204 configured to be pressed (forced) against the coiled tubing 104 using adjacent hydraulic cylinders 206. In the illustrated embodiment, actuating the hydraulic cylinders 206 may engage and bias inwardly corresponding pressure beams 208 through adjacent trunnions 210. As the opposing pressure beams 208 are pressed toward each other with the hydraulic cylinders 206, many pairs of opposed gripper blocks 204 extending along the pressure beams 208 will be simultaneously forced into contact with the coiled tubing 104. The squeezing and gripping force applied to the coiled tubing 104 by the gripper blocks 204 may be varied by adjusting the hydraulic fluid pressure to the hydraulic cylinders 206.

The gripper blocks 204 are machined to engage and fit the outer circumference of the coiled tubing 104. In some embodiments, for example, the gripper blocks 204 may be V-shaped or may alternatively be arcuate or curved in shape to substantially match the outer curvature of the coiled tubing 104. The gripper blocks 204 are designed to engage a range of outer diameters of the coiled tubing 104 while simultaneously minimizing damage thereto. The injector assembly 106 operates on the principle of frictional restraint, in that the coiled tubing 104 is loaded by the opposing gripper blocks 204 with sufficient magnitude of applied normal force that the resulting tangential friction forces are greater than the axial tubing loads (tension or compression). Consequently, the gripper blocks 204 may be able to advance or retract the coiled tubing 104 and also bear the weight of the coiled tubing 104 and any tools or assemblies attached thereto.

The drive chains 202 are actuated (driven) by sprockets 214, and the sprockets 214 are driven by the counter-rotating hydraulic motors 109 (FIG. 1). Idler sprockets 216 take up slack in the drive chains 202. A roller chain 212 interposes the pressure beams 208 and the drive chains 202 to reduce friction therebetween as the drive chains 202 are driven in rotation.

Referring again to FIG. 1, with continued reference to FIG. 2, any tools to be conveyed downhole can be connected to the coiled tubing 104 using special connectors. The number of tools that are to be run downhole may be limited by the maximum weight capacity or tensile strength of the coiled tubing 104. When a tool is to be run downhole, the stripper assembly 114 is disconnected from the BOP 116 and lifted upwards and sideways. The coiled tubing 104 is fed through the lubricator until it appears below the stripper assembly 114 and the tools are connected to the distal end of the coiled tubing 104. The tools are then lifted back into the stripper assembly 114, which can then be positioned and made-up onto the BOP 116.

The tool string at the end of the coiled tubing 104 will typically include a "no-go" at or near its upper end, which is engageable with a bushing arranged in the stripper assembly 114. The no-go is designed to prevent the tools from inadvertently retracting upwards and into the injector assembly 106. The outer diameter of the no-go is larger than the inner diameter of the bushing in the stripper assembly 114 so that the tools are prevented from reversing into the injector assembly 106 and potentially getting stuck in or damaging the tubing guide arch 108.

The tools are lowered into the wellbore by operating the hydraulic motors 109 of the injector assembly 106, which pushes or "injects" the coiled tubing 104 downwards using the drive chains 202 and associated gripper blocks 204. The motors 109 drive the drive chains 202, which move the gripper blocks 204 up or down in a conveyor-belt style motion. At the same time, the reel 102 may be operated to provide a smooth feed of the coiled tubing 104 to the injector assembly 106. The linear speed of the coiled tubing 104 is dependent on the speed at which the reel 102 and the injector assembly 106 operate, and can be adjusted in real-time by an operator at the control console 120. Accordingly, an operator may program the linear speed of the coiled tubing 104 from the control console 120 to meet operational requirements.

The weight of the tool string being run into the wellbore, including the weight of the coiled tubing 104, dictates the tension sustained by the coiled tubing 104. Tension in the coiled tubing 104 will be small (minimal) when close to the surface (i.e., near the wellhead 112), but will be large (maximum) when the coiled tubing 104 is extended to at or near the bottom of the well. The coiled tubing 104 is conveyed downhole at a controlled speed to help ensure that the coiled tubing 104 is not excessively overloaded or shocked, which could cause loss of integrity in the coiled tubing 104.

Breaking (or severing) the coiled tubing 104 while extended downhole can have serious consequences. If the coiled tubing 104 breaks above the BOP 116 when tools are on bottom with maximum tension in the coiled tubing 104, the coiled tubing 104 will recoil and could potentially be ejected out of the injector assembly 106 at an enormous velocity. A similar recoil may be experienced even when the tools are near the wellhead 112, inside the stripper assembly 114, and the no-go is being forced (pulled) against the bushing within the stripper assembly 114. It is also possible that the coiled tubing 104 slips or breaks while being run downhole, in which case it may not recoil but the severed portion will drop to the bottom of the wellbore. This can lead to expensive fishing operations to recover the lost part in the wellbore. According to embodiments of the present disclosure, the system 100 may include a fail-safe mechanism designed to prevent sudden recoil of the coiled tubing 104 out of the wellbore or sudden slippage into the wellbore in the case of mechanical failure of the coiled tubing 104.

Referring again to FIG. 2, the system 100 may further include a snap arrestor 218, which may operate as a fail-safe mechanism configured to monitor and detect real-time movement of the coiled tubing 104. When movement of the coiled tubing 104 exceeds a predetermined limit (velocity), the snap arrestor 218 may be configured and otherwise programmed to trigger actuation of the hydraulic cylinders 206 and thereby cause the gripper blocks 204 to forcefully grip and stop movement of the coiled tubing 104. In physics, the rate of change of speed of an object (e.g., the coiled tubing 104) is known as "acceleration," the rate at which the acceleration of the object changes with respect to time is known as "jerk," and the rate of change of the jerk of an object is known as "jounce" or "snap". Hence the term "snap" arrestor 218, since the snap arrestor 218 is designed to stop movement of the coiled tubing 104 once movement or acceleration of the coiled tubing 104 is detected above a certain threshold.

In some embodiments, as illustrated, the snap arrestor 218 may be positioned between and otherwise interpose the injector assembly 106 and the well control stack 110 and, more particularly, between the injector assembly 106 and the stripper assembly 114. In other embodiments, however, it is contemplated herein to position the snap arrestor 218 vertically above (upstream) the injector assembly 106. In such embodiments, placement of the snap arrestor 218 above the injector assembly 106 may depend on whether there is sufficient space available at that location.

As illustrated, the snap arrestor 218 may include one or more wheels 220 arranged to contact the outer surface of the coiled tubing 104 as it moves through (into or out) the injector assembly 106. In the illustrated embodiment, the snap arrestor 218 includes two wheels 220 arranged on opposing sides of the coiled tubing 104. In other embodiments, however, the snap arrestor 218 could alternatively include only one wheel 220. In yet other embodiments, the snap arrestor 218 may include more than two wheels 220, such as three wheels equidistantly spaced from each other about the outer circumference of the coiled tubing 104. In some embodiments, the wheels 220 may be made of a rigid and wear-resistant material, such as cast iron, but could alternatively be made of other types of materials, without departing from the scope of the disclosure.

The wheels 220 may be rotatably mounted to a structural support 222 below the injector assembly 106, and the coiled tubing 104 may extend through a central aperture 224 defined in the structural support 222. The wheels 220 may be positioned and otherwise arranged to provide (achieve) constant lateral contact with the outer surface of the coiled tubing 104. Accordingly, each wheel 220 may provide a constant inward force against the coiled tubing 104, which may prove advantageous in helping to stabilize the coiled tubing 104 as it moves longitudinally; i.e., up or down as driven by the injector assembly 106.

As the injector assembly 106 moves (drives) the coiled tubing 104 longitudinally, the wheels 220 may correspondingly rotate due to friction forces generated from contact with the outer surface of the coiled tubing 104. The snap arrestor 218 may further include a tachometer 226 configured to measure the velocity or rotations per minute (RPM) of the wheels 220. In some embodiments, for example, the tachometer 226 may include one or more sensors 228 configured to measure and report the RPM of the wheels 220. The sensor 228 may comprise any type of digital, analog, electric, optical, magnetic (Hall effect) or mechanical sensor capable of measuring the RPM of the wheels 220. In one or more embodiments, for example, at least one of the wheels 220 may provide or otherwise define one or more markings 230 and the sensor 228 may be arranged to detect the markings 230 as the wheels rotate 220, which is used to determine the RPM of the wheels 220.

The tachometer 226 receives the output of the sensor 228 and feeds the output into a microprocessor 232 in communication with the tachometer 226 and programmed and otherwise configured to convert the measured RPM of the wheels 220 into a real-time measured linear speed of the coiled tubing 104. In some embodiments, the microprocessor 232 may form part of the tachometer 226, but could alternatively comprise a separate component part of the snap arrestor 218. The microprocessor 232 may also be programmed with a predetermined linear speed threshold for the coiled tubing 104, and if the real-time measured linear speed of the coiled tubing 104 exceeds the predetermined linear speed threshold, that may be an indication that the coiled tubing 104 has been broken or severed. In such cases, the microprocessor 232 may then be configured and otherwise programmed to instantaneously cease operation of the injector assembly 106 and simultaneously activate the hydraulic cylinders 206 to drive the gripper blocks 204 into gripping engagement (i.e., grippingly engage) with the coiled tubing 104, which arrests (ceases) longitudinal movement of the coiled tubing 104 within the injector assembly 106.

The microprocessor 232 may be communicably coupled to (e.g., in communication with) the control console 120. When the real-time measured linear speed of the coiled tubing 104 exceeds the predetermined linear speed threshold, the microprocessor 232 may be programmed to send a command signal to the control console 120 to cease operation of the hydraulic motors 209 (FIG. 1) and thereby cease driving of the drive chains 202. The microprocessor 232 may also be communicably coupled to (e.g., in communication with) the hydraulic cylinders 206. When the real-time measured linear speed of the coiled tubing 104 exceeds the predetermined linear speed threshold, the microprocessor 232 may be programmed to send a command signal to the hydraulic cylinders 206 to activate the closing mechanism of the gripper blocks 204 and thereby arrest (cease) movement of the coiled tubing 104 within the injector assembly 106. Gripping engagement of the gripper blocks 204 prevent the coiled tubing from being ejected from the injector assembly 106 or dropping down into the wellbore, until such time that the coiled tubing 104 can be secured, re-latched and removed from the injector assembly 106. As will be appreciated, the command signals sent by the microprocessor 232 may be transmitted instantaneously, thereby preventing any unwanted movement of the coiled tubing 104.

In some embodiments, an operator of the system 100 may set a predetermined linear speed range that is expected during normal conveyance of the coiled tubing 104 during operation of the system 100. In such embodiments, the predetermined linear speed threshold would comprise the upper limit of the predetermined linear speed range, above which the coiled tubing 104 would be considered broken or severed. Accordingly, once the tachometer 226 reports a real-time measured linear speed of the coiled tubing 104 that exceeds the predetermined linear speed threshold, the microprocessor 232 will instantaneously send command signals that cease operation of the reel 102, the injector assembly 106, and drive the gripper blocks 204 into gripping engagement with the coiled tubing 104 to cease any further longitudinal movement of the coiled tubing 104 within the injector assembly 106.

In other embodiments, an operator of the system 100 may send command signals to the reel 102 and the injector assembly 106 to longitudinally move the coiled tubing 104 at a desired linear speed. In such embodiments, the predetermined linear speed threshold would comprise a real-time measured linear speed offset from the desired linear speed by a known amount; e.g., one foot per second, two feet per second, three feet per second, etc. Accordingly, once the tachometer 226 reports a real-time measured linear speed that exceeds the desired linear speed by the known amount, the microprocessor 232 will instantaneously send command signals that cease operation of the reel 102, the injector assembly 106, and drive the gripper blocks 204 into gripping engagement with the coiled tubing 104 to arrest (cease) any further longitudinal movement of the coiled tubing 104 within the injector assembly 106.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A coiled tubing system, comprising:
    an injector assembly configured to receive and longitudinally move coiled tubing through the injector assembly;
    a well control stack operatively coupled to the injector assembly and configured to receive the coiled tubing from the injector assembly; and
    a snap arrestor including:
        one or more wheels configured to rotate as the coiled tubing moves longitudinally;
        a tachometer that measures rotations per minute (RPM) of the one or more wheels; and
        a microprocessor that receives and converts the RPM into a real-time measured linear speed of the coiled tubing,
    wherein, when the real-time measured linear speed of the coiled tubing exceeds a predetermined linear speed threshold, a command signal is sent to the injector assembly to grippingly engage the coiled tubing and thereby arrest longitudinal movement of the coiled tubing.

2. The system of claim 1, wherein the well control stack includes a stripper assembly and a blowout preventer, and wherein the stripper assembly interposes the injector assembly and the BOP, and the snap arrestor interposes the injector assembly and the stripper assembly.

3. The system of claim 1, wherein the one or more wheels comprise two wheels arranged on opposing sides of the coiled tubing and arranged to contact an outer surface of the coiled tubing.

4. The system of claim 3, wherein the one or more wheels provide constant lateral contact with the outer surface of the coiled tubing.

5. The system of claim 1, wherein the tachometer includes one or more sensors that measure and report the RPM.

6. The system of claim 5, wherein at least one of the one or more wheels provides one or more markings, and the one or more sensors are arranged to detect the one or more markings and thereby determine the RPM.

7. The system of claim 1, wherein the injector assembly comprises:
    a pair of endless drive chains positioned on opposite sides of the coiled tubing;
    a plurality of gripper blocks attached to each endless drive chain; and
    one or more hydraulic cylinders operable to force the plurality of gripper blocks into engagement with the coiled tubing,
    wherein the microprocessor communicates with the one or more hydraulic cylinders and sends the command signal to activate the one or more hydraulic cylinders to drive the plurality of gripper blocks into gripping engagement with the coiled tubing.

8. The system of claim 7, further comprising:
    a reel that feeds the coiled tubing to the injector assembly;
    one or more first hydraulic motors configured to drive rotation of the reel;
    one or more second hydraulic motors configured to drive rotation of the pair of endless drive chains and thereby longitudinally move the coiled tubing;
    a power source that provides hydraulic fluid for the one or more first and second hydraulic motors; and
    a control console in communication with the power source and operable to convey the hydraulic fluid to the one or more first and second hydraulic motors,
    wherein the microprocessor communicates with the control console and sends a command signal to cease operation of the one or more first and second hydraulic motors when the real-time measured linear speed of the coiled tubing exceeds the predetermined linear speed threshold.

9. The system of claim 1, wherein the injector assembly is selected from the group consisting of an opposed counter-rotating, chain drive system, an arched-chain roller drive system, a single-chain, opposed gripper-drive system, a sheave drive system, and any combination thereof.

10. A method, comprising:
    receiving coiled tubing at an injector assembly having a well control stack operatively coupled thereto;
    operating the injector assembly to longitudinally move the coiled tubing through the injector assembly and the well control stack;
    calculating a real-time measured linear speed of the coiled tubing with a snap arrestor that includes:
        one or more wheels configured to rotate as the coiled tubing moves longitudinally;
        a tachometer that measures rotations per minute (RPM) of the one or more wheels; and
        a microprocessor that receives and converts the RPM into a real-time measured linear speed of the coiled tubing;

sending a command signal to the injector assembly when the real-time measured linear speed of the coiled tubing exceeds a predetermined linear speed threshold; and in response to receipt of the command signal, grippingly engaging the coiled tubing with the injector assembly and thereby ceasing longitudinal movement of the coiled tubing.

11. The method of claim 10, wherein the one or more wheels comprise two wheels arranged on opposing sides of the coiled tubing, the method further comprising providing constant lateral contact with an outer surface of the coiled tubing with the one or more wheels.

12. The method of claim 10, wherein the tachometer includes one or more sensors, the method further comprising:

measuring the RPM of the one or more wheels with the one or more sensors; and reporting the RPM to the microprocessor.

13. The method of claim 12, wherein at least one of the one or more wheels provides one or more markings, the method further comprising detecting the one or more markings with the one or more sensors and thereby determining the RPM.

14. The method of claim 10, wherein the injector assembly includes a pair of endless drive chains positioned on opposite sides of the coiled tubing, a plurality of gripper blocks attached to each endless drive chain, and one or more hydraulic cylinders operable to force the plurality of gripper blocks into engagement with the coiled tubing, wherein sending the command signal to the injector assembly comprises:

sending the command signal to the one or more hydraulic cylinders with the microprocessor; and grippingly engaging the coiled tubing with the plurality of gripper blocks in response to receipt of the command signal.

15. The method of claim 14, wherein a reel feeds the coiled tubing to the injector assembly, one or more first hydraulic motors are operable to drive rotation of the reel, and one or more second hydraulic motors are operable to configured to drive rotation of the pair of endless drive chains and thereby longitudinally move the coiled tubing, the method further comprising:

providing hydraulic fluid for the one or more first and second hydraulic motors with a power source;

manipulating one or more valves via operation of a control console in communication with the power source and thereby selectively conveying the hydraulic fluid to the one or more first and second hydraulic motors; and sending a command signal from the microprocessor to the control console to cease operation of the one or more first and second hydraulic motors when the real-time measured linear speed of the coiled tubing exceeds the predetermined linear speed threshold.

* * * * *